(12) United States Patent
Whitney

(10) Patent No.: US 6,356,380 B1
(45) Date of Patent: Mar. 12, 2002

(54) APPARATUS FOR IMAGING LIGHT FROM MULTIFACETED LASER DIODES ONTO A MULTICHANNEL SPATIAL LIGHT MODULATOR

(75) Inventor: Theodore Robert Whitney, Woodland Hills, CA (US)

(73) Assignee: Barco Graphics NV, Gent (BE)

(*) Notice: Subject to any disclaimer, the term of this patent is extended or adjusted under 35 U.S.C. 154(b) by 0 days.

(21) Appl. No.: 09/433,842

(22) Filed: Nov. 4, 1999

Related U.S. Application Data (60) Provisional application No. 60/106,981, filed on Nov. 4, 1998.

(51) Int. Cl.[7] ................................................. G02F 1/00
(52) U.S. Cl. ........................ 359/321; 359/619; 359/623
(58) Field of Search ................................. 359/623, 619, 359/321

(56) References Cited

U.S. PATENT DOCUMENTS 5,517,359 A * 5/1996 Gelbart ........................ 359/623

* cited by examiner

Primary Examiner—Georgia Epps
Assistant Examiner—John J. Magee (57) ABSTRACT

Compact linear diode arrays are imaged on linear light modulator arrays by optical systems employing objective asphere/prism segments together with a field lens such that the beams rise in object space or image space, and individual beams are imaged on individual modulator segments with chosen form factors and spacings. More than one laser array can be directed in superimposed fashion onto a single modulator array using laser polarization modes and a polarization beam combiner.

15 Claims, 4 Drawing Sheets

APPARATUS FOR IMAGING LIGHT FROM MULTIFACETED LASER DIODES ONTO A MULTICHANNEL SPATIAL LIGHT MODULATOR

This invention claims priority from a provisional application of Theodore R. Whitney, Application No. 60/106,981 filed Nov. 4, 1998.

FIELD OF THE INVENTION

The present invention relates to devices and methods for illuminating a multichannel linear light modulator array with a linear array of multielement laser diodes.

BACKGROUND OF THE INVENTION

In the present art a method is known for optically gathering laser light from a multielement laser diode array and imaging it onto a linear light modulator in such a manner that the image of each of the elements or facets of the laser array is superimposed at the linear light modulator. Such systems, as discussed in U.S. Pat. No. 5,521,748 to Sarraf, are used to generate images at high speed during recordation on a light sensitive sheet or other medium. In practical systems, the need for improved optics to improve efficiency and reduce size has become evident.

Another example is found in U.S. Pat. No. 5,517,359 to Gelbart, an object of which is not only to collect and direct most of the light from the laser facets onto the modulator, but to illuminate the entire modulator with the image of each laser facet so as to increase the reliability of the system, should any one emitter fail.

The design is such that, while there is reliance on very wide area laser diodes, the LaGrange product is conserved. The method of design described in U.S. Pat. No. 5,517,359, however, requires high magnification in the objective lens. The image of each laser facet must be enlarged to the size of the modulator. Because of this requirement for high magnification, the design according to the method described in U.S. Pat. No. 5,517,359 many times leads to longer than desired optical paths from the laser to the modulator. However, in the current state of the art redundancy is no longer a prime factor in the need to conserve LaGrange product. There is therefore a need for a compact, optically efficient apparatus that enables a linear array of light sources to illuminate a target area through a linear array of modulators.

SUMMARY OF THE INVENTION

A set of optical systems are described wherein the optical path in any given example is much shorter than heretofore achieved but where the modulator is entirely illuminated in all its segments. In one example a combined light bundle emerges through a minimum angular spread and can therefore match a spatial light modulator having a small angular acceptance. In another example the light bundle is differentially converged on the fast and slow axes of the source. In both examples, the sources, such as laser diodes, individually illuminate modulators and target areas because the ray beams, from each laser, are first angled in accordance with the relative lateral spacing of the targets and then directed through individual microlenses lens system in combination with a field lens system to arrive at the modulator with chosen shape factors, angles and areas.

The degrees of freedom afforded by this design are used to increase the dimensions of the laser facet spacings and the dimensions of the microlenses used to collect and focus the laser light. This makes the laser array more able to dissipate thermal energy, and easier to drive to higher powers. It also enables the microlens to be more efficient and easier to assemble. In addition, devices in accordance with the invention may make use of the fast and slow axes of the ray packages to provide contiguous images along the elements of a modulator array, and focus points in the orthogonal direction. Furthermore, the sum of the emittances from all the sources combined can be matched to the acceptance of the modulator for best optical efficiency.

Apparatus for imaging light from a laser diode array onto a multichannel linear light modulator includes in one example, one or more broad emitting area laser diode arrays having multiple emitters operating in parallel to illuminate the linear light modulator. In an arrangement where one laser diode array is used, a microlens array is positioned close to the laser diode so as to project each of the laser emitter facets onto a successive segment of the linear light modulator, with the images or parallel beams from each emitter sequentially arranged along the length of the linear light modulator, the light from each emitter covering a successive portion of the length of the modulator. The array of microlenses has a pitch equal to or greater than the pitch of the emitting laser facets and equal to or less than the center-to-center distance of the illuminated segments of the modulator. The focal length of each element of the microlens array is slightly less than the distance from the laser emitters to an axial distance where the light beams from adjacent emitters start to overlap.

Between the laser array and the microlens array, cylindrical lens means are provided, for example by a long microcylinder, for changing the divergence of the light from the emitters in a direction perpendicular to the longer dimension of the emitting laser facets. Typically the power contributed by the long microcylinder is sufficient to convert the wider divergence of the beams in the narrow or fast axis of the laser facets to become close to the divergence of the beams in the long or slow axis. Such an arrangement results in an optical design in which all channels appear to be operating on-axis, and they each consequently achieve diffraction limited imagery in both the X and Y directions.

In another example, the pitch of the modulator elements is greater than that of the laser elements, and the ray bundles are divergent but also imaged to approximate focus points in both the fast and slow axes. This enables the admittance of the modulator elements to be matched to the emittance of the lasers for best optical efficiency.

In yet another example two laser diode bars are orthogonally disposed with collimators and microlens arrays to direct multiple beams toward an optical cube, which combines both sets in common parallel paths toward a linear modulator. Using the polarization property of the laser a polarization rotator in one of the orthogonal beam sets assures that fast and slow axis orientations from both beam sets are superimposed at the modulator.

BRIEF DESCRIPTION OF THE DRAWINGS

A better understanding of the invention may be had by reference to the following description taken in conjunction with the accompanying drawings, in which:

FIG. 2, comprising a plan view FIG. 2a and a side view FIG. 2b, is a diagrammatic representation of the disposition of optical elements and beam ray paths in the example of FIG. 1, showing the manner in which images are formed in the fast axis direction and parallel beams are formed in the slow axis direction;

FIG. 3, comprising plan view FIG. 3a and side view FIG. 3b is a diagrammatic representation of the principal elements and beam ray paths in an example in accordance with the invention, in which the modulator is illuminated with beam paths converging into images that have small angular acceptance.

DETAILED DESCRIPTION OF THE INVENTION

Figure 1:
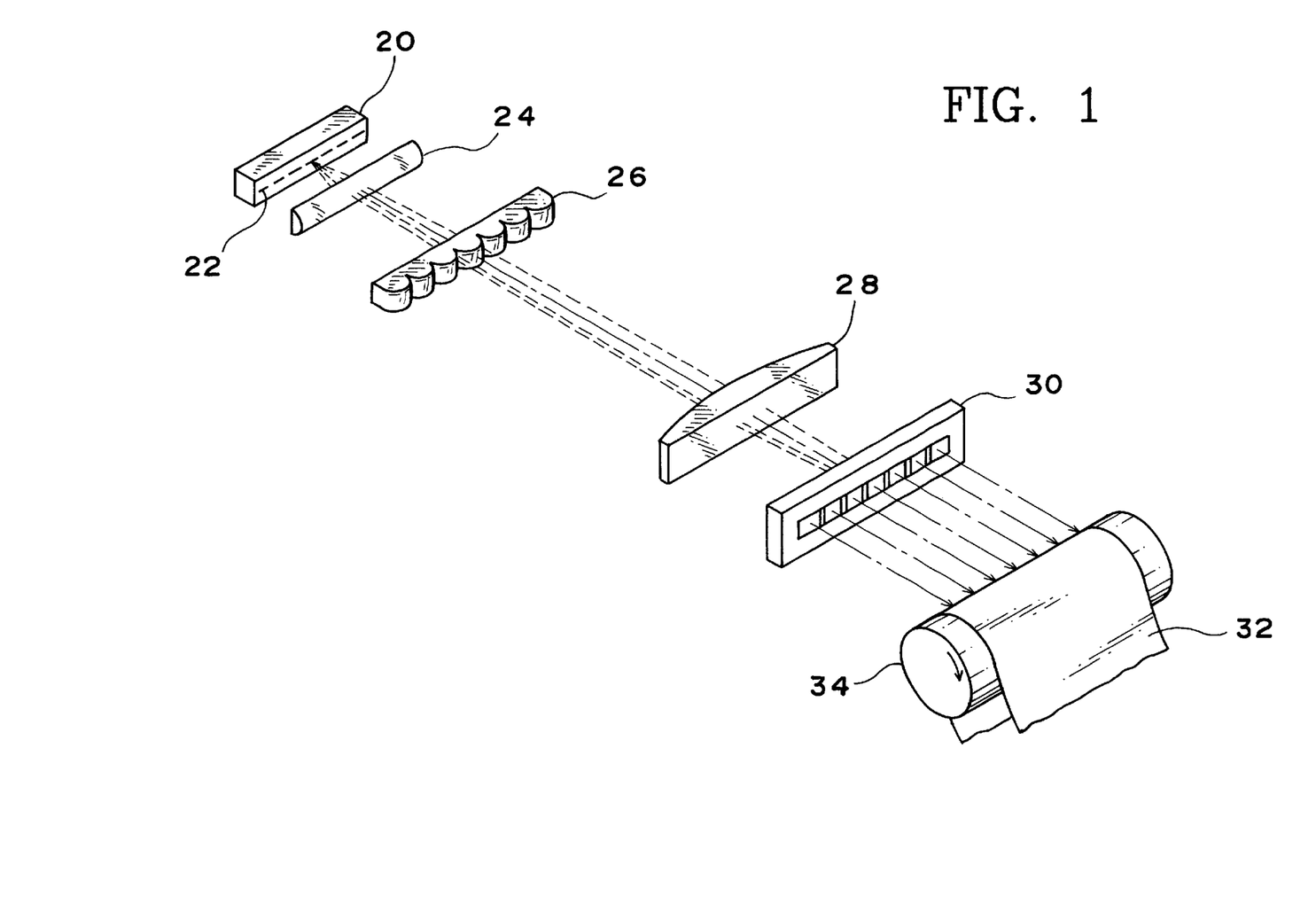
FIG. 1 is a perspective view of a device in accordance with the invention.
Figure 2A:
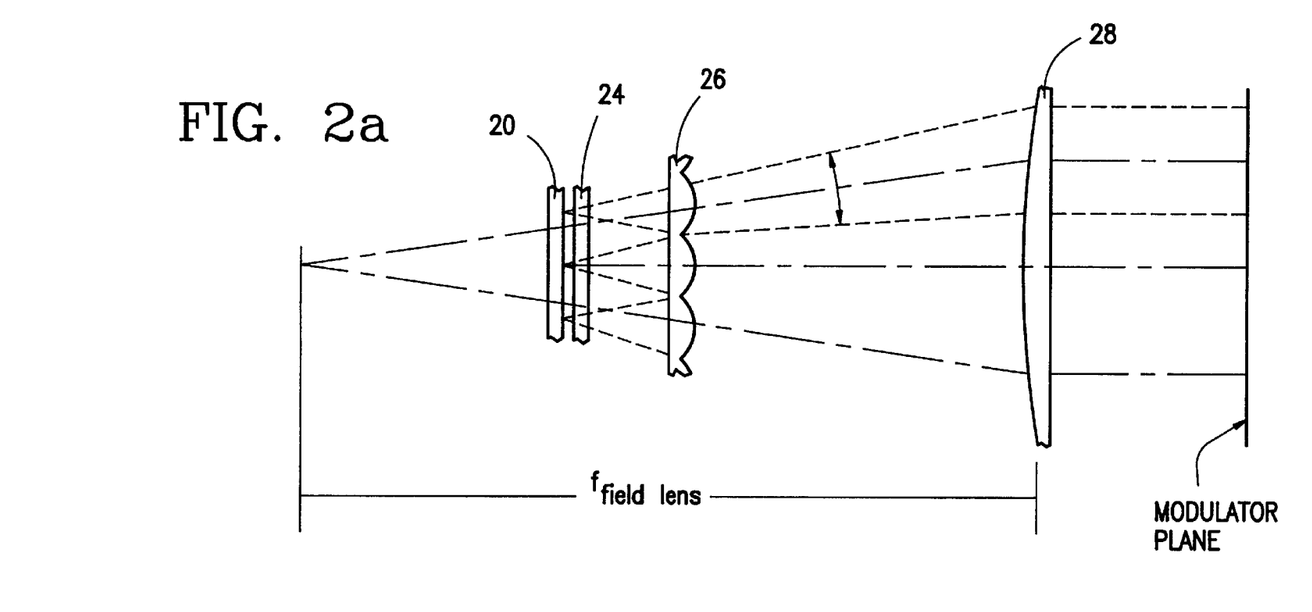
Figure 2B:
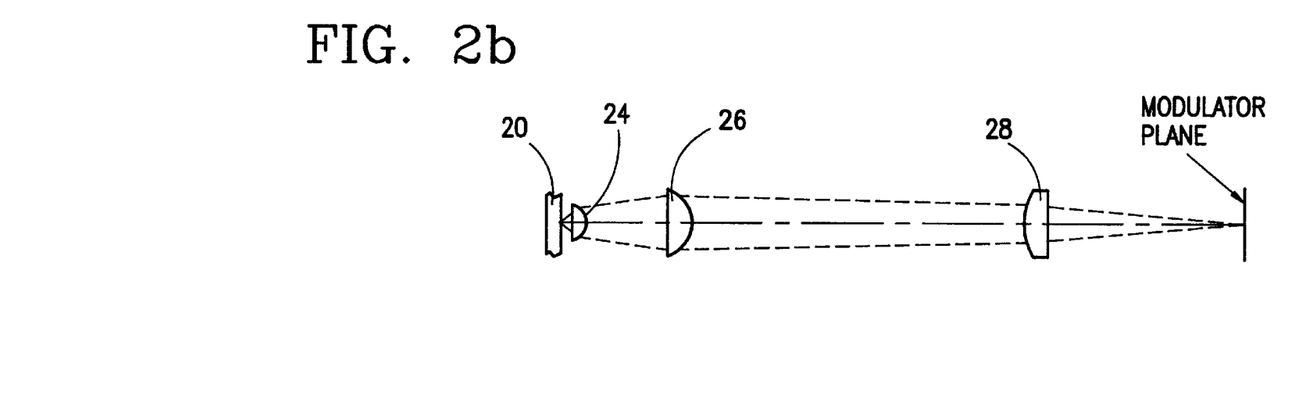
Figure 3A:
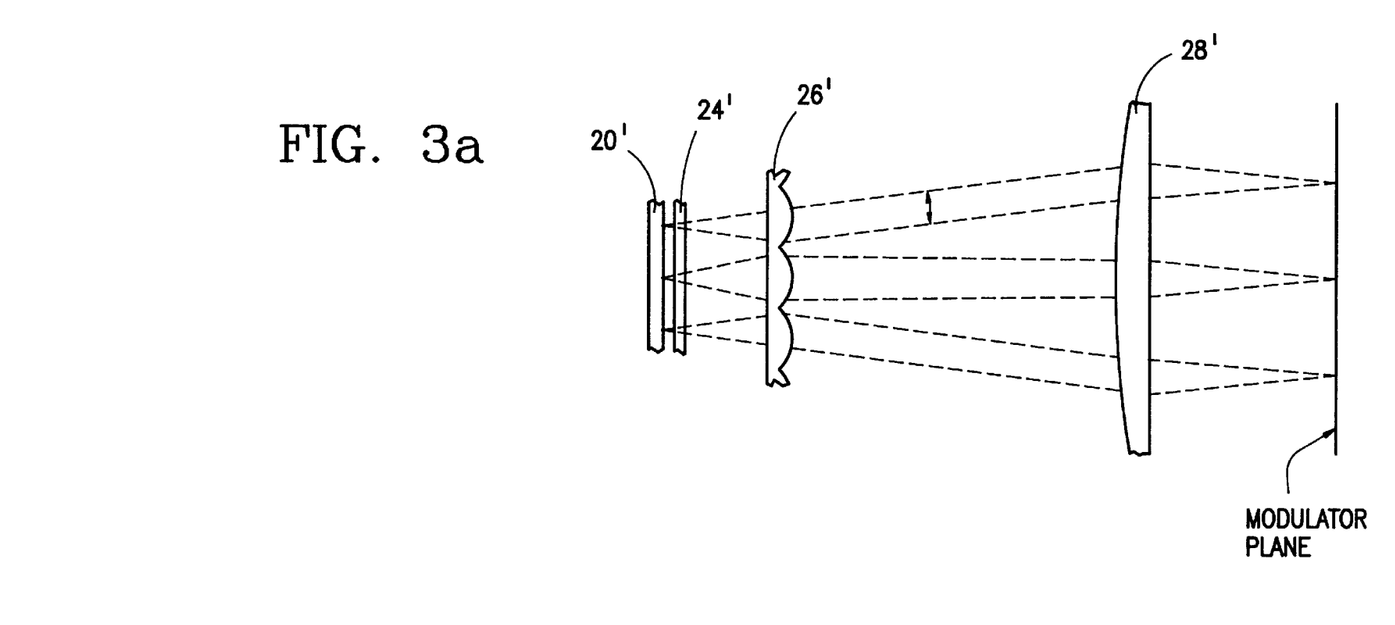
Figure 3B:
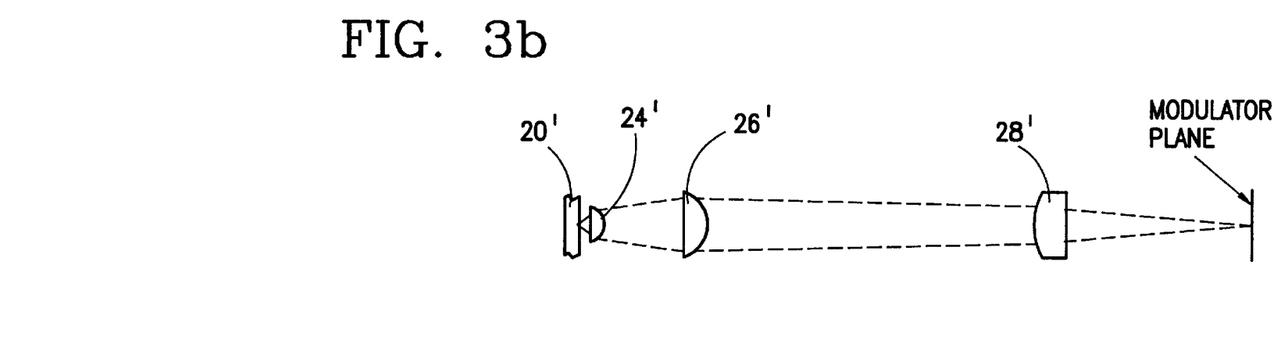

Two variants of a preferred design are illustrated in FIGS. 1, 2a and 2b on the one hand and FIGS. 3a and 3b on the other. Referring to FIGS. 1, 2a and 3a (the latter two of which for simplicity show only a three element fragment), laser facets 22 on a laser diode bar 20, direct beamlets through a rod lens 24 onto objective asphere/prism segments 26. The separate ray bundles illuminate field lens line segments 28 and then modulator line segments 32 at the modulator 30. The prism segments with aspheric objective 26 accomplish the required rise of each beam bundle in image space, rather than in object space and do not require severe prism bending. FIG. 2a also illustrates the required selection of field lens 28 placement and focal length from an image point behind the laser facets 22 to redirect the ray bundles parallel to the axis toward a light modulator array 30. From the modulator 30 the individual beams, which may be converged to a high density pattern by a lens (not shown) are directed onto a photosensitive surface, here a sheet 32 and a rotatable drum 34. Assuming that, as seen in FIG. 1, the laser bar 20 comprises seven emitting facets 22, each 100 microns long, separated by a center-to-center distance of 1600 microns. This is a relatively broad emitting surface, so that the emerging beams are refracted before crossing paths. With a laser 20 to microlens 26 distance of 8.572 mm, the aperture of each microlens 26 segment in the direction along the modulator segments 30 will be 1.6 mm. it is made to be longer in the cross-direction, to include more of the fast axis laser beam, partially collimated by the long rod cylinder lens 24. Successive beams will be centered at heights of 0, ±1.6 mm, ±3.2 mm, and ±4.8 mm emergent from the objective. They must rise to heights of 0, ±2.643 mm, ±5.286 mm, and ±7.929 mm at the field lens, in front of the modulator 30 aperture, which is located, according to thin lens optics, at the magnification x the object distance, or $$\frac{18.5}{7x.1} \times 8.572 = 226.55 \text{ mm away.}$$

This means that successive segments of the objective must incorporate prism power, up to ±0.8° in the outermost beams.

The beams rise the required amounts in the space between the objective and the field lens. They are then redirected, parallel to the axis by the field lens or a segmented prism, relatively closer to-the modulator aperture.

The difference between the configurations illustrated in FIGS. 1, 2a and b, and FIGS. 3a and b, is that in the second configuration each 22 laser facet is imaged at the modulator 30 plane, in both the slow axis and the fast axis directions. In the first configuration the facet is imaged in the fast axis direction, but forms parallel beams in the slow axis direction.

In FIGS. 2a and 2b the focal length of the field lens is chosen to be greater than its distance from the objective, the focal point of the field lens being placed such that the central beam from each objective segment is rendered parallel to the axis.

Both designs above, placing the beam rise in object space or placing it in image space, and both configurations of the second design accomplish the same end result. Seven beams illuminate seven segments of the modulator, with the central ray of each bundle parallel to the (central) axis. The difference between the two approaches is that building the beam rise into object space leads to the requirement for a seven segment wedge of considerable prism power in an already crowded object space, it leads to a relatively short image distance, but has the advantage that it permits a slightly larger aperture in each objective segment, consequently a diffractive optic which is slightly easier to build.

Building the beam rise into the image space requires an aperture in the slow direction for each objective segment of 1.6 mm, but because of the smaller object distance, 8.572 mm instead of 14.5 mm, yields a smaller field lens distance, and consequently a package which is easier to design. The aperture in the fast direction is made slightly larger, to capture more of the laser beam, because space is available. As before, in the example where the beam rise takes place in object space, the image height segment covered by each beam is 2.643 mm, and the divergence of each beam is $$\frac{1.6}{226.5} = 7 \times 10^{-3} \text{ radians.}$$

Between these two design configurations the advantage lies with the second, with the beam height displacements taking place in image space. The objective lens can be made entirely diffractive, or as a fresnelled refractive element, or as a hybrid, part one, part the other. If the segmented objective is entirely diffractive, it may suffer some loss in diffraction efficiency. If part of its power is refractive (still with a 100% fill factor), such a small lens element is still highly efficient. Another reason to split the power between refractive and diffractive surfaces is to avoid the loss of transmission which can result when a polarized beam is passed through a diffractive element whose features are too small, approaching a few wavelengths. Such a hybrid lens is made by Wavefront Sciences of Albuquerque, N.Mex.

When the aperture of a spatial light modulator to be illuminated is greater than the size of the laser bar (presently greater than 12 mm at a maximum, although it can be smaller), one must bend the successive beams outward by successive amounts using prisms of varying bending power. This beam displacement can be produced either in the space immediately after the long collimating cylinder, incorporated as a part of the objective, or in image space located between the objective and the modulator.

Figure 4:
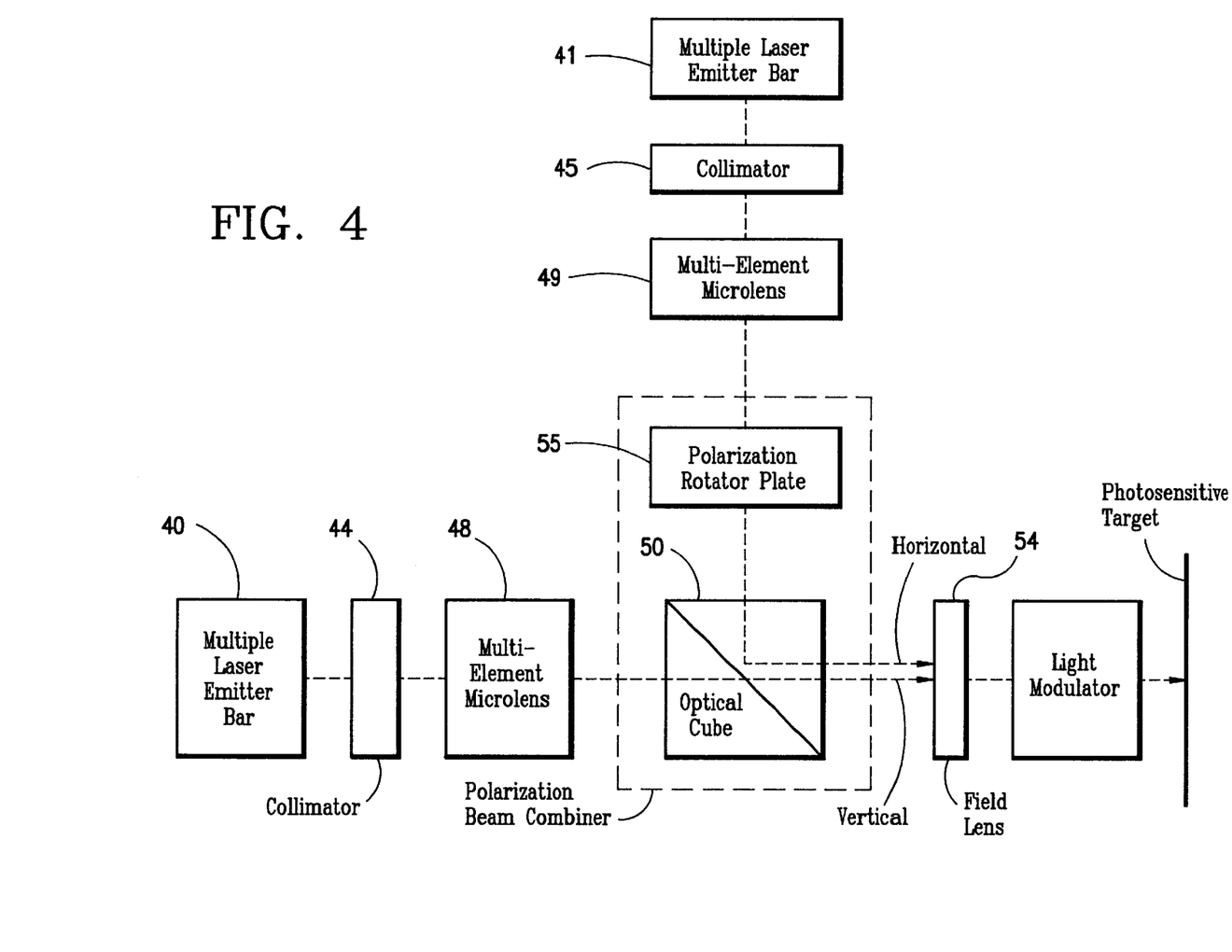
FIG. 4 is a block diagram of a third arrangement in accordance with the invention in which the elements of a modulator array are illuminated by laser facets from two different emitter bars.

In an alternate arrangement, FIG. 4, two laser diode arrays 40, 41 are used, and because the light from the laser facets is about 90% polarized, the two laser paths are separately collimated by collimators 44, 45, separately focused by multielement microlenses 48, 49 and combined in a polarization beam combiner including an optical cube 50, located in the path of the longer conjugate between the microlenses 48, 49 and a multi-element light modulator 58 after a single field lens 54. The recombining design typically includes a polarization rotating plate, 55, and a polarization sensitive reflecting and transmitting surface within an optical cube, 50 Thus each segment of the modulator 58 receives a beam formed from light of two polarizations, from two corresponding facets, one in each illuminating laser array 40 or 41.

In designs where two laser bars are used, and the beams are combined by polarization the relative distances are similar, but the numbers are changed somewhat because of the additional thickness of glass traversed in the polarization combining system.

An example of the design illustrated in FIGS. 1, 2a and 2b is given in Table 1a, b, c and d, where seven 100 micron laser facets are located on 1400 micron centers, where the length of the total modulator line to be illuminated is 18 mm long, where the fast axis cylinder lens is Blue Sky Part M210, where the seven segmented objective is made of fused silica, where the distance from the objective the field lens is 235 mm, where the field lens is JML Part No. PPX13020, where the distance from the field lens to the illuminated modulator line aperture is 47 mm.

The half angular divergences produced at the modulator by the design of Table 1a, b, c and d are shown in Table 2a, b, c and d, stated in tangents of small angles, which are very close to radian values.

A clear and important distinction can be made between the design method taught in the prior art and the design method taught in this invention, in the way that the two approaches conserve the Lagrange product. Emitting sources, such as diode lasers, have one Lagrange product in the fast axis, expressed as the Y dimension of the source multiplied by the sine of the angle within it radiates. There is another corresponding Lagrange product in the plane of the slow axis. Where there are multiple emitters, the total Lagrange product of emittance available to the designer is the sum of the products from each emitter. So also the spatial light modulator has an admittance, expressed in the same units as the diode emittance. A geometrically perfectly efficient system can be created by a properly designed optical system when the total emittance of the sum of all of the individual laser diode facet sources just matches the admittance of the modulator, in both the slow and fast axis directions. Any light emitted beyond this modulator admittance product cannot be transformed by lenses or forced through the modulator by any optical means. In practice the optical designer tries to approach this perfect match as closely as possible.

The method of U.S. Pat. No. 5,517,359 optically transforms the multiple laser sources into images which are each as long as the total modulator aperture, and reduces their angular spread so that their angular ray cones can be laid out side by side and still not exceed the angular spread accepted by the modulator. The method taught by the present invention enlarges the facet images to only a selected fraction of the total length admitted by the modulator, one seventh of the length in the design case presented here, preserving a seven times larger convergence angle. These seven images or beams are laid end to end and all pass through the admittance of the modulator, but in a fundamentally different shape factor. Thus the linear dimensions of the emergent beams or images are laid end to end in the present example and the divergence angle of each beam is the same, whereas in the prior example the linear dimensions of the images are all as large as the modulator linear admittance, the divergence angles are smaller, and the angular cones of the beams lie side by side to pass through the angular admittance of the modulator. Both methods are conservative of Lagrange product, but the present invention, because of its larger angles and smaller individual beam dimensions, leads to correspondingly smaller system designs.

In order to distinguish clearly the advantage of this design over prior methods the following comparative example is offered. Assume that the laser array comprises seven emitting facets, each 100 microns long, located in a line and separated such that the center-to-center distance between facets is 1000 microns. Assume further that the total divergence of the beam from each facet in the slow axis direction is 10 degrees. The spatial light modulator is assumed to be 18.5 mm long. With these laser parameters the distance from the laser to the microlens array is approximately 5.14 mm.

Because the modulator is 18.5 mm long, each laser facet illuminates one-seventh or about 2.65 mm of the modulator length and the seven emitting facets together cooperate to illuminate the entire length of the modulator. Therefore, by a well-known thin lens relationship, the magnification from the emitting facet to the field lens at the plane of the illuminated modulator segment is 26.43×. The distance from the microlens array to the field lens and spatial light modulator therefore is 26.43×5.143 mm =135.9 mm.

Using the same laser and modulator configuration and designing a system according to the prior teaching, one arrives at the necessity for an objective (thin lens) magnification of 185× to enlarge the image of each laser facet to cover the entire modulator, and assuming the same minimum back object distance, 5.14 mm, a consequent required forward conjugate distance of 951.5 mm.

There is often a need to preserve a small angular beam spread at the modulator, as well as to conserve the Lagrange product. In this case optimum design requires that the successive ray fans from the objective segments to the successive modulator segments must have central rays which lie parallel to one another, rather than fanning out contiguously when they arrive at the modulator.

This means either that the laser facets must be placed at a center-to-center distance equal to the size of the modulator segments which are illuminated by each laser facet, or the ray paths must be optically manipulated, for example by prismatic bending, so that the laser facet elements will appear, from image space, to be spaced apart to correspond with the illuminated modulator segments. This prismatic bending can occur before the objective in object space, combined with the objective or immediately after the objective, in image space. In the latter case, the second prism function, redirecting the central rays of the ray bundles to be parallel to each other, can either be served by a field lens, located close to the modulator, or by an array of diffractive prisms, shaped to bend the central ray of each beam bundle back onto the axis. The field lens, if used, is located intermediately between the objective and the modulator plane, and consequently serves principally to redirect the ray bundles, as well as to focus them onto the modulator. The focusing power is supplied almost entirely by the segmented objective.

An illumination system designed in accordance with this invention may also minimize the total emergent angle of the ray fan such that the modulator elements may have the same pitch as the laser elements. Assume that a laser array is constructed with seven emitting facets, each 100 microns long, and they are spaced at a 1600 micron center-to-center distance along the laser bar. Such a laser bar will be very nearly 10 mm long. The objective microlens segments will have a focal length slightly less than 8.5 mm and the resulting illuminated line at the spatial light modulator will be slightly more than 10 mm long.

In present commercial practice it is feasible to make laser arrays which are up to 10 mm long, but in sizes larger than 10 mm the yield becomes poor and longer laser bars of high specific brightness (expressed in mWatts per micron of emitting facet length) are not commercially available. When the acceptance aperture of a spatial light modulator is less than 10 mm long, one can space the illuminating laser facets appropriately along the laser bar, and project directly through the system with a number of parallel and substantially identical optical paths, making use of successive segments of the objective. One cannot, at present, make an illuminator according to this design which illuminates a line longer than about 12 mm, because of the lack of availability of longer laser bars. When such bars become available, this design configuration will be practical.

Assume that the modulator is 18.5 mm long, and that there are seven modulator segments to be illuminated, 2.64 mm center-to-center. If the seven optical paths are to emerge from the objective parallel to each other, this difference in ray height from the laser facets to the objective segments must be made up, by deviating each ray path—except the central path, by successive amounts. In the first arrangement, this displacement must occur in the space between the microcylinder and the objective.

In this first arrangement after a given beam is bent and is displaced to the proper distance from center, it is redirected axially again by another optical wedge, this one incorporated in a segment of the objective lens. On the image side of the objective lens it will appear that the beam came from a laser facet having a displacement from the axis equal to the displacement of the objective segment. Therefore the central ray of each ray bundle will be parallel to the axis, and the divergence of the entire bundle will be the same as the divergence of each of the component beams.

If, in this example, the beams are spread prismatically in object space to the separation of the illuminated modulator segments, 2.654 mm, this requires micro prisms bending each beam sideways by different amounts, from 0° to a maximum of 28.6°. Because of the larger center-to-center distance of the objective segments, there is a longer distance from the laser facets to the point where the beam edges from the different beams cross over each other. In this case the object distance becomes 14.33 mm, the aperture of each of the objective segments becomes 2.643 mm, the image distance 384 mm, and the input divergence angle in the modulator is a constant $6.9 \times 10^{-3}$ radians in each beam.

In all examples where comparative illuminating systems are designed to conserve the Lagrange product, systems designed according to this invention will have very substantially shorter forward conjugate distances and will consequently be much easier to incorporate into graphics systems.

TABLE 1a

Optical Design for Laser Facet 4

RLE
ID FUSILICA.123,23 SEPT, 99 FROM BARCOW   11
ID1 THIS DESIGN IS LASER 4 IN TWO DIMENSIONS, 36.36 DEGREES
ID2 +.0034.−.0034 CONV. IN THE X-MERIDIAN, +/−.0033 IN Y.
ID3 PUPIL .1 LAMBDA PP. RIPPLED. SPOT 150 MU X++ 7.709 MM
ID4 X00 0.0 MM., X−+ 12 2.868 MM.,
ID5 Y++ 3 .364 MM. FIELD LENS JML PPX13020
  WAVL .835000 .835000 .835000
  APS     −4
  WAP     1
  GLOBAL
  XPXT
  RPUPIL
  UNITS MM
  OBJ FINITE   0.100000000   0.00036100   0.05000000
  REF ANGLE   36.35999608   0.00062153   4.99999832   0.04929629
  0 AIR
  1 CV   0.00000000   TH   0.00027450
  1 AIR
  2 CV   0.00000000   TH   0.90000000
  2 N1 1.607230 N2 1.607230 N3 1.607230
  2 GTBS -'F2   '
  3 RAD   −0.43157000   TH   6.44494176
  3 AIR
  3 CC   −0.59160000
  3 ASTOR   0.00000000
  3 DC1 0.000000E+00 −2.506000E−01 −4.185000E−01 −1.769500E+00 0.000000E+00
  4 CV   0.00000000   TH   0.00000000
  4 AIR
  5 CV   0.00000000   TH   0.00000000
  5 N1 1.452735 N2 1.452735 N3 1.452735
  5 GTB U   'FUSILICA'
  6 CV   0.00000000   TH   0.00000000
  6 N1 10.11000 N2 10.11000 N3 10.11000
  6 GID 'GLASS '
  7 RAD   8.28593294   TH   235.00000000
  7 AIR
  7 CC   0.48333356
  7 ASTOR   −77.06435071
  7 DC1 −6.379168E−02 −1.107605E−03 2.598774E−04 −1.478795E−05 −2.654835E−05
  7 DECEN   0.00000000   0.00000000   0.00000000   1
  7 BT   0   0.00000000   1
  8 CV   0.00000000   TH   0.00055903
  8 AIR
  9 CV   0.00000000   TH   1.87999998
  9 GLM   1.47300000   65.70000000
  9 DECEN   0   0.00000000   0.00000000   4

TABLE 1a-continued

Optical Design for Laser Facet 4

```
 9 BT  0.00000000    0.00000000    4
10 RAD -237.92999003  TH   0.00000000
10 AIR
11 CV   0.00000000   TH   47.00000000
11 AIR
12 CV   0.00000000   TH   0.00000000
12 AIR
END
```

TABLE 1b

Optical Design for Laser Facet 1

```
RLE
ID FUSILICA.124,23 SEPT, 99 FROM -.124   11
ID1 THIS DESIGN IS LASER 1 IN TWO DIMENSIONS, 36.36 DEGREES
ID2 +.0036 -.0029 CONV. IN THE X-MERIDIAN, +/-.0033 IN Y.
ID3 PUPIL .1 LAMBDA PP. RIPPLED. SPOT 150 MU X++ 7.709 MM
ID4 X00 12 -7.709 MM., X-+ 12 -4.85 MM., X+- 12 -10.58
ID5 Y++ 3 .364 MM. X++ 12 -8.032 FIELD LENS JML PPX13020
 WAVL .835000 .835000 .835000
 APS      -4
 WAP       1
 GLOBAL
 XPXT
 RPUPIL
 UNITS MM
 OBJ FINITE    0.100000000    0.00036100    0.05000000
 REF ANGLE    36.35999580    0.00062153    4.99999828    0.042929629
  0 AIR
  1 CV    0.00000000    TH    0.00027450
  1 AIR
  2 CV    0.00000000    TH    0.90000000
  2 N1 1.607230 N2 1.607230 N3 1.607230
  2 GTB S 'F2  '
  3 RAD   -0.43157000    TH    6.44494176
  3 AIR
  3 CC    -0.59160000
  3 ASTOR    0.00000000
  3 DC1 0.000000E+00 -2.506000E-01 -4.185000E-01 -1.769500E+00 0.000000E+00
  4 CV    0.00000000    TH    0.00000000
  4 AIR
  5 CV    0.00000000    TH    1.58750000
  5 N1 1.452735 N2 1.452735 N3 1.452735
  5 GTB U  'FUSILICA'
  6 CV    0.00000000    TH    0.01000000
  6 N1 10.11000 N2 10.11000 N3 10.11000
  6 GID 'GLASS '
  7 RAD    8.28593294    TH    235.00000000
  7 AIR
  7 CC    0.48333356
  7 ASTOR   -77.06435071
  7 DC1 -6.379168E-02 -1.107605E-03 2.598774E-04 -1.478795E-05 -2.654835E-05
  7 DECEN    0.00000000    0.00000000    0.00000000    1
  7 BT     -0.09371248    0.00000000    1
  8 CV    0.00000000    TH    0.00055903
  8 AIR
  9 CV    0.00000000    TH    1.87999998
  9 GLM    1.47300000        65.70000000
  9 DECEN    4.20000000    0.00000000    0.00000000    4
  9 BT     0.00000000    0.00000000    4
 10 RAD -237.92999003    TH    0.00000000
 10 AIR
 11 CV    0.00000000    TH    47.00000000
 11 AIR
 12 CV    0.00000000    TH    0.00000000
 12 AIR
END
```

TABLE 1c

Optical Design for Laser Facet 2

```
RLE
ID FUSILICA.12, 23 SEPT, 99 FROM -.124    11
ID1 THIS DESIGN IS LASER 2 IN TWO DIMENSIONS, 36.36 DEGREES
ID2 +.0035. -.0032 CONV. IN THE X-MERIDIAN, +/-.0033 IN Y.
ID3 PUPIL .1 LAMBDA PP. RIPPLED. SPOT 150 MU X++ 7.709 MM
ID4 X00 0.0 12 -5.140 MM., X-+ 12 -2.27 MM., X+- 12 -8.007
ID5 Y++ 3 .364 MM. FIELD LENS JML PPX13020
 WAVL .835000 .835000 .835000
 APS     -4
 WAP      1
 GLOBAL
 XPXT
 RPUPIL
 UNITS MM
 OBJ FINITE    0.100000000    0.00036100    0.05000000
 REF ANGLE    36.35999580    0.00062153    4.99999828    0.04929629
  0 AIR
  1 CV    0.00000000    TH    0.00027450
  1 AIR
  2 CV    0.00000000    TH    0.90000000
  2 N1 1.607230 N2 1.607230 N3 1.607230
  2 GTB S    'F2    '
  3 RAD    -0.43157000    TH    6.44494176
  3 AIR
  3 CC    -0.59160000
  3 ASTOR    0.00000000
  3 DC1 0.000000E+00 -2.506000E-01 -4.185000E-01 -1.769500E+00 0.000000E+00
  4 CV    0.00000000    TH    0.00000000
  4 AIR
  5 CV    0.00000000    TH    1.58750000
  5 N1 1.452735 N2 10.11000 N3 10.11000
  5 GTB U    'FUSILICA'
  6 CV    0.00000000    TH    0.01000000
  6 N1 10.11000 N2 10.11000 N3 10.11000
  6 GID 'GLASS '
  7 RAD    8.28593294    TH    235.00000000
  7 AIR
  7 CC    0.48333356
  7 ASTOR    -77.06435071
  7 DC1 -6.379168E-02 -1.107605E-03 2.598774E-04 -1.478795E-05 -2.654835E-05
  7 DECEN    0.00000000    0.00000000    0.00000000    1
  7 BT    -0.06247661    0.00000000    1
  8 CV    0.00000000    TH    0.00055903
  8 AIR
  9 CV    0.00000000    TH    1.87999998
  9 GLM    1.47300000    65.70000000
  9 DECEN    2.80000000    0.00000000    0.00000000    4
  9 BT    0.00000000    0.00000000    4
 10 RAD -237.92999003    TH    0.00000000
 10 AIR
 11 CV    0.00000000    TH    47.00000000
 11 AIR
 12 CV    0.00000000    TH    0.00000000
 12 AIR
END
```

TABLE 1d

Optical Design for Laser Facet 3

```
RLE
ID FUSILICA.126, 23 SEPT, 99 FROM -.124    11
ID1 THIS DESIGN IS LASER 3 IN TWO DIMENSIONS, 36.36 DEGREES
ID2 +.0034. -.0033 CONV. IN THE X-MERIDIAN, +/-.0033 IN Y.
ID3 PUPIL .1 LAMBDA PP. RIPPLED. SPOT 150 MU X++ 7.709 MM
ID4 X00 12 -2.570 MM., X-+ 12 -.298 MM., X+- 12 -5.437
ID5 Y++ 3 .364 MM. FIELD LENS JML PPX13020
 WAVL .835000 .835000 .835000
 APS     -4
 WAP      1
 GLOBAL
 XPXT
 RPUPIL
 UNITS MM
```

TABLE 1d-continued

Optical Design for Laser Facet 3

```
OBJ FINITE    0.100000000    0.00036100    0.05000000
REF ANGLE    36.35999552    0.00062153    4.99999824    0.04929629
0 AIR
1 CV    0.00000000    TH    0.00027450
1 AIR
2 CV    0.00000000    TH    0.90000000
2 N1 1.607230 N2 1.607230 N3 1.607230
2 GTB S    'F2   '
3 RAD    -0.43157000    TH    6.44494176
3 AIR
3 CC    -0.59160000
3 ASTOR    0.00000000
3 DC1 0.000000E+00 -2.506000E-01 -4.185000E-01 -1.769500E+00 0.000000E+00
4 CV    0.00000000    TH    0.00000000
4 AIR
5 CV    0.00000000    TH    1.57650000
5 N1 1.452735 N2 1.452735 N3 1.452735
5 GTB U    'FUSILICA'
6 CV    0.00000000    TH    0.01000000
6 N1 10.11000 N2 10.11000 N3 10.11000
6 GID 'GLASS '
7 RAD    8.28593294    TH    235.00000000
7 AIR
7 CC    0.48333356
7 ASTOR    -77.06435071
7 DC1 -6.379168E-02 -1.107605E-03 2.598774E-04 -1.478795E-05 -2.654835E-05
7 DECEN    0.00000000    0.00000000    0.00000000    1
7 BT    -0.031239    0.00000000    1
8 CV    0.00000000    TH    0.00055903
8 AIR
9 CV    0.00000000    TH    1.87999998
9 GLM    1.47300000    65.70000000
9 DECEN    0    1.40000000    0.00000000    0.00000000    4
9 BT    0.00000000    0.00000000    4
10 RAD -237.92999003    TH    0.00000000
10 AIR
11 CV    0.00000000    TH    47.00000000
11 AIR
12 CV    0.00000000    TH    0.00000000
12 AIR
END
```

TABLE 2a

Divergence at the Modulator Plane from Laser Facet 4

| | Angle tangents | Relative Aperture |
|---|---|---|
| | A cut in the fast axis plane, full field. | |
| 1 | 0.00309123 | -1.00000000 |
| 2 | 0.00279125 | -0.90000000 |
| 3 | 0.00248577 | -0.80000000 |
| 4 | 0.00216949 | -0.70000000 |
| 5 | 0.00184539 | -0.60000000 |
| 6 | 0.00151716 | -0.50000000 |
| 7 | 0.00118579 | -0.40000000 |
| 8 | 0.00085074 | -0.30000000 |
| 9 | 0.00051291 | -0.20000000 |
| 10 | 0.00017506 | -0.10000000 |
| 11 | -0.00016076 | -1.38777878E-16 |
| 12 | -0.00049454 | 0.10000000 |
| 13 | -0.00082626 | 0.20000000 |
| 14 | -0.00115394 | 0.30000000 |
| 15 | -0.00147542 | 0.40000000 |
| 16 | -0.00179080 | 0.50000000 |
| 17 | -0.00210171 | 0.60000000 |
| 18 | -0.00240811 | 0.70000000 |
| 19 | -0.00270710 | 0.80000000 |
| 20 | -0.00299614 | 0.90000000 |
| 21 | -0.00328055 | 1.00000000 |

TABLE 2a-continued

Divergence at the Modulator Plane from Laser Facet 4

| | Angle tangents | Relative Aperture |
|---|---|---|
| | A cut in the fast axis plane on axis. | |
| 1 | 0.00318593 | -1.00000000 |
| 2 | 0.00289375 | -0.90000000 |
| 3 | 0.00259649 | -0.80000000 |
| 4 | 0.00228886 | -0.70000000 |
| 5 | 0.00197361 | -0.60000000 |
| 6 | 0.00165404 | -0.50000000 |
| 7 | 0.00133066 | -0.40000000 |
| 8 | 0.00100238 | -0.30000000 |
| 9 | 0.00066961 | -0.20000000 |
| 10 | 0.00033481 | -0.10000000 |
| 11 | -3.65509311E-18 | -1.38777878E-16 |
| 12 | -0.00033481 | 0.10000000 |
| 13 | -0.00066961 | 0.20000000 |
| 14 | -0.00100238 | 0.30000000 |
| 15 | -0.00133066 | 0.40000000 |
| 16 | -0.00165404 | 0.50000000 |
| 17 | -0.00197361 | 0.60000000 |
| 18 | -0.00228886 | 0.70000000 |
| 19 | -0.00259649 | 0.80000000 |
| 20 | -0.00289375 | 0.90000000 |
| 21 | -0.00318593 | 1.00000000 |

TABLE 2a-continued

Divergence at the Modulator Plane from Laser Facet 4

| | Angle tangents | Relative Aperture |
|---|---|---|
| | A cut in the fast axis plane, minus full field. | |
| 1 | 0.00328055 | −1.00000000 |
| 2 | 0.00299614 | −0.90000000 |
| 3 | 0.00270710 | −0.80000000 |
| 4 | 0.00240812 | −0.70000000 |
| 5 | 0.00210171 | −0.60000000 |
| 6 | 0.00179080 | −0.50000000 |
| 7 | 0.00147542 | −0.40000000 |
| 8 | 0.00115394 | −0.30000000 |
| 9 | 0.00082626 | −0.20000000 |
| 10 | 0.00049454 | −0.10000000 |
| 11 | 0.00016076 | −1.38777878E−16 |
| 12 | −0.00017506 | 0.10000000 |
| 13 | −0.00051291 | 0.20000000 |
| 14 | −0.00085074 | 0.30000000 |
| 15 | −0.00118579 | 0.40000000 |
| 16 | −0.00151716 | 0.50000000 |
| 17 | −0.00184539 | 0.60000000 |
| 18 | −0.00216949 | 0.70000000 |
| 19 | −0.00248577 | 0.80000000 |
| 20 | −0.00279125 | 0.90000000 |
| 21 | −0.00309123 | 1.00000000 |
| | A cut in the slow axis plane, full field. | |
| 1 | −0.00311637 | −1.00000000 |
| 2 | −0.00316222 | −0.90000000 |
| 3 | −0.00319895 | −0.80000000 |
| 4 | −0.00322748 | −0.70000000 |
| 5 | −0.00324870 | −0.60000000 |
| 6 | −0.00326353 | −0.50000000 |
| 7 | −0.00327290 | −0.40000000 |
| 8 | −0.00327774 | −0.30000000 |
| 9 | −0.00327898 | −0.20000000 |
| 10 | −0.00327757 | 0.10000000 |
| 11 | −0.00327445 | −1.38777878E−16 |
| 12 | −0.00327056 | 0.10000000 |
| 13 | −0.00326686 | 0.20000000 |
| 14 | −0.00326429 | 0.30000000 |
| 15 | −0.00326379 | 0.40000000 |
| 16 | −0.00326631 | 0.50000000 |
| 17 | −0.00327279 | 0.60000000 |
| 18 | −0.00328416 | 0.70000000 |
| 19 | −0.00330135 | 0.80000000 |
| 20 | −0.00332529 | 0.90000000 |
| 21 | −0.00335689 | 1.00000000 |
| | A cut in the slow axis plane, on axis. | |
| 1 | 0.00011711 | −1.00000000 |
| 2 | 0.00007870 | −0.90000000 |
| 3 | 0.00004867 | −0.80000000 |
| 4 | 0.00002612 | −0.70000000 |
| 5 | 0.00001014 | −0.60000000 |
| 6 | −2.02514275E−07 | −0.50000000 |
| 7 | −0.00000583 | −0.40000000 |
| 8 | −0.00000768 | −0.30000000 |
| 9 | −0.00000670 | −0.20000000 |
| 10 | −0.00000382 | −0.10000000 |
| 11 | −6.32347340E−18 | −1.38777878E−16 |
| 12 | 0.00000382 | 0.10000000 |
| 13 | 0.00000670 | 0.20000000 |
| 14 | 0.00000768 | 0.30000000 |
| 15 | 0.00000583 | 0.40000000 |
| 16 | 2.02514275E−07 | 0.50000000 |
| 17 | −0.00001014 | 0.60000000 |
| 18 | −0.00002612 | 0.70000000 |
| 19 | −0.00004867 | 0.80000000 |
| 20 | −0.00007870 | 0.90000000 |
| 21 | −0.00011711 | 1.00000000 |
| | A cut in the slow axis plane, minus full field. | |
| 1 | 0.00335689 | −1.00000000 |
| 2 | 0.00332529 | −0.90000000 |
| 3 | 0.00330135 | −0.80000000 |
| 4 | 0.00328416 | −0.70000000 |
| 5 | 0.00327279 | −0.60000000 |
| 6 | 0.00326631 | −0.50000000 |
| 7 | 0.00326379 | −0.40000000 |
| 8 | 0.00326429 | −0.30000000 |
| 9 | 0.00326686 | −0.20000000 |
| 10 | 0.00327056 | −0.10000000 |
| 11 | 0.00327445 | −1.38777878E−16 |
| 12 | 0.00327757 | 0.10000000 |
| 13 | 0.00327898 | 0.20000000 |
| 14 | 0.00327774 | 0.30000000 |
| 15 | 0.00327290 | 0.40000000 |
| 16 | 0.00326353 | 0.50000000 |
| 17 | 0.00324870 | 0.60000000 |
| 18 | 0.00322748 | 0.70000000 |
| 19 | 0.00319895 | 0.80000000 |
| 20 | 0.00316222 | 0.90000000 |
| 21 | 0.00311637 | 1.00000000 |

TABLE 2b

Divergence at the Modulator Plane from Laser Facet 1

| | Angle tangents | Relative Aperture |
|---|---|---|
| | A cut in the fast axis plane, full field. | |
| 1 | 0.00309215 | −1.00000000 |
| 2 | 0.00279208 | −0.90000000 |
| 3 | 0.00248651 | −0.80000000 |
| 4 | 0.00217013 | −0.70000000 |
| 5 | 0.00184594 | −0.60000000 |
| 6 | 0.00151762 | −0.50000000 |
| 7 | 0.00118615 | −0.40000000 |
| 8 | 0.00085102 | −0.30000000 |
| 9 | 0.00051310 | −0.20000000 |
| 10 | 0.00017516 | −0.10000000 |
| 11 | −0.00016074 | −1.38777878E−16 |
| 12 | −0.00049461 | 0.10000000 |
| 13 | −0.00082642 | 0.20000000 |
| 14 | −0.00115419 | 0.30000000 |
| 15 | −0.00147576 | 0.40000000 |
| 16 | −0.00179123 | 0.50000000 |
| 17 | −0.00210223 | 0.60000000 |
| 18 | −0.00240873 | 0.70000000 |
| 19 | −0.00270781 | 0.80000000 |
| 20 | −0.00299695 | 0.90000000 |
| 21 | −0.00328145 | 1.00000000 |
| | A cut in the fast axis plane, on axis. | |
| 1 | 0.00318684 | −1.00000000 |
| 2 | 0.00289456 | −0.90000000 |
| 3 | 0.00259721 | −0.80000000 |
| 4 | 0.00228949 | −0.70000000 |
| 5 | 0.00197414 | −0.60000000 |
| 6 | 0.00165448 | −0.50000000 |
| 7 | 0.00133101 | −0.40000000 |
| 8 | 0.00100265 | −0.30000000 |
| 9 | 0.00066979 | −0.20000000 |
| 10 | 0.00033490 | −0.10000000 |
| 11 | −3.65331322E−18 | −1.38777878E−16 |
| 12 | −0.00033490 | 0.10000000 |
| 13 | −0.00066979 | 0.20000000 |
| 14 | −0.00100265 | 0.30000000 |
| 15 | −0.00133101 | 0.40000000 |
| 16 | −0.00165448 | 0.50000000 |
| 17 | −0.00197414 | 0.60000000 |
| 18 | −0.00228949 | 0.70000000 |
| 19 | −0.00259721 | 0.80000000 |
| 20 | −0.00289456 | 0.90000000 |
| 21 | −0.00318684 | 1.00000000 |

TABLE 2b-continued

Divergence at the Modulator Plane from Laser Facet 1

| | Angle tangents | Relative Aperture |
|---|---|---|
| | A cut in the fast axis plane, minus full field. | |
| 1 | 0.00328145 | −1.00000000 |
| 2 | 0.00299695 | −0.90000000 |
| 3 | 0.00270781 | −0.80000000 |
| 4 | 0.00240873 | −0.70000000 |
| 5 | 0.00210223 | −0.60000000 |
| 6 | 0.00179123 | −0.50000000 |
| 7 | 0.00147576 | −0.40000000 |
| 8 | 0.00115419 | −0.30000000 |
| 9 | 0.00082642 | −0.20000000 |
| 10 | 0.00049461 | −0.10000000 |
| 11 | 0.00016074 | −1.38777878E−16 |
| 12 | −0.00017516 | 0.10000000 |
| 13 | −0.00051310 | 0.20000000 |
| 14 | −0.00085102 | 0.30000000 |
| 15 | −0.00118616 | 0.40000000 |
| 16 | −0.00151762 | 0.50000000 |
| 17 | −0.00184594 | 0.60000000 |
| 18 | −0.00217013 | 0.70000000 |
| 19 | −0.00248651 | 0.80000000 |
| 20 | −0.00279208 | 0.90000000 |
| 21 | −0.00309215 | 1.00000000 |
| | A cut in the slow axis plane, full field. | |
| 1 | −0.00287541 | −1.00000000 |
| 2 | −0.00292168 | −0.90000000 |
| 3 | −0.00295884 | −0.80000000 |
| 4 | −0.00298778 | −0.70000000 |
| 5 | −0.00300941 | −0.60000000 |
| 6 | −0.00302465 | −0.50000000 |
| 7 | −0.00303442 | −0.40000000 |
| 8 | −0.00303964 | −0.30000000 |
| 9 | −0.00304126 | −0.20000000 |
| 10 | −0.00304021 | −0.10000000 |
| 11 | −0.00303745 | −1.38777878E−16 |
| 12 | −0.00303391 | 0.10000000 |
| 13 | −0.00303053 | 0.20000000 |
| 14 | −0.00302828 | 0.30000000 |
| 15 | −0.00302809 | 0.40000000 |
| 16 | −0.00303091 | 0.50000000 |
| 17 | −0.00303767 | 0.60000000 |
| 18 | −0.00304931 | 0.70000000 |
| 19 | −0.00306676 | 0.80000000 |
| 20 | −0.00309095 | 0.90000000 |
| 21 | −0.00312278 | 1.00000000 |
| | A cut in the slow axis plane, on axis. | |
| 1 | 0.00035622 | −1.00000000 |
| 2 | 0.00031745 | −0.90000000 |
| 3 | 0.00028708 | −0.80000000 |
| 4 | 0.00026419 | −0.70000000 |
| 5 | 0.00024788 | −0.60000000 |
| 6 | 0.00023722 | −0.50000000 |
| 7 | 0.00023128 | −0.40000000 |
| 8 | 0.00022913 | −0.30000000 |
| 9 | 0.00022982 | −0.20000000 |
| 10 | 0.00023242 | −0.10000000 |
| 11 | 0.00023597 | −1.38777878E−16 |
| 12 | 0.00023954 | 0.10000000 |
| 13 | 0.00024217 | 0.20000000 |
| 14 | 0.00024292 | 0.30000000 |
| 15 | 0.00024085 | 0.40000000 |
| 16 | 0.00023501 | 0.50000000 |
| 17 | 0.00022447 | 0.60000000 |
| 18 | 0.00020830 | 0.70000000 |
| 19 | 0.00018558 | 0.80000000 |
| 20 | 0.00015538 | 0.90000000 |
| 21 | 0.00011681 | 1.00000000 |
| | A cut in the slow axis plane, minus full field. | |
| 1 | 0.00359438 | −1.00000000 |
| 2 | 0.00356252 | −0.90000000 |
| 3 | 0.00353832 | −0.80000000 |
| 4 | 0.00352087 | −0.70000000 |
| 5 | 0.00350925 | −0.60000000 |
| 6 | 0.00350253 | −0.50000000 |
| 7 | 0.00349979 | −0.40000000 |
| 8 | 0.00350007 | −0.30000000 |
| 9 | 0.00350244 | −0.20000000 |
| 10 | 0.00350595 | −0.10000000 |
| 11 | 0.00350965 | −1.38777878E−16 |
| 12 | 0.00351260 | 0.10000000 |
| 13 | 0.00351385 | 0.20000000 |
| 14 | 0.00351246 | 0.30000000 |
| 15 | 0.00350749 | 0.40000000 |
| 16 | 0.00349799 | 0.50000000 |
| 17 | 0.00348305 | 0.60000000 |
| 18 | 0.00346173 | 0.70000000 |
| 19 | 0.00343311 | 0.80000000 |
| 20 | 0.00339629 | 0.90000000 |
| 21 | 0.00335037 | 1.00000000 |

TABLE 2c

Divergence at the Modulator Plane from Laser Facet 2

| | Angle tangent | Relative Aperture |
|---|---|---|
| | A cut in the fast axis plane, full field. | |
| 1 | 0.00309164 | −1.00000000 |
| 2 | 0.00279162 | −0.90000000 |
| 3 | 0.00248610 | −0.80000000 |
| 4 | 0.00246977 | −0.70000000 |
| 5 | 0.00184563 | −0.60000000 |
| 6 | 0.00151736 | −0.50000000 |
| 7 | 0.00118595 | −0.40000000 |
| 8 | 0.00085087 | −0.30000000 |
| 9 | 0.00051300 | −0.20000000 |
| 10 | 0.00017510 | −0.10000000 |
| 11 | −0.00016075 | −1.38777878E−16 |
| 12 | −0.00049457 | 0.10000000 |
| 13 | −0.00082633 | 0.20000000 |
| 14 | −0.00115405 | 0.30000000 |
| 15 | −0.00147557 | 0.40000000 |
| 16 | −0.00179100 | 0.50000000 |
| 17 | −0.00210194 | 0.60000000 |
| 18 | −0.00240839 | 0.70000000 |
| 19 | 0.00270741 | 0.80000000 |
| 20 | −0.00299650 | 0.90000000 |
| 21 | −0.00328095 | 1.00000000 |
| | A cut in the fast axis plane, on axis. | |
| 1 | 0.00318633 | −1.00000000 |
| 2 | 0.00289411 | −0.90000000 |
| 3 | 0.00259681 | −0.80000000 |
| 4 | 0.00228914 | −0.70000000 |
| 5 | 0.00197384 | −0.60000000 |
| 6 | 0.00165423 | −0.50000000 |
| 7 | 0.00133081 | −0.40000000 |
| 8 | 0.00100250 | −0.30000000 |
| 9 | 0.00066969 | −0.20000000 |
| 10 | 0.00033485 | −0.10000000 |
| 11 | −3.65357337E−18 | −1.38777878E−16 |
| 12 | −0.00033485 | 0.10000000 |
| 13 | −0.00066969 | 0.20000000 |
| 14 | −0.00100250 | 0.30000000 |
| 15 | −0.00133081 | 0.40000000 |
| 16 | −0.00165423 | 0.50000000 |
| 17 | −0.00197385 | 0.60000000 |
| 18 | −0.00228914 | 0.70000000 |
| 19 | −0.00259681 | 0.80000000 |
| 20 | −0.00289411 | 0.90000000 |
| 21 | −0.00318633 | 1.00000000 |

TABLE 2c-continued

Divergence at the Modulator Plane from Laser Facet 2

| | Angle tangent | Relative Aperture |
|---|---|---|
| | A cut in the fast axis plane, minus full field. | |
| 1 | 0.00328095 | −1.00000000 |
| 2 | 0.00299650 | −0.90000000 |
| 3 | 0.00270741 | −0.80000000 |
| 4 | 0.00240839 | −0.70000000 |
| 5 | 0.00210194 | −0.60000000 |
| 6 | 0.00179100 | −0.50000000 |
| 7 | 0.00147557 | −0.40000000 |
| 8 | 0.00115405 | −0.30000000 |
| 9 | 0.00082633 | −0.20000000 |
| 10 | 0.00049457 | −0.10000000 |
| 11 | 0.00016075 | −1.38777878E−16 |
| 12 | −0.00017510 | 0.10000000 |
| 13 | −0.00051300 | 0.20000000 |
| 14 | −0.00085087 | 0.30000000 |
| 15 | −0.00118595 | 0.40000000 |
| 16 | −0.00151736 | 0.50000000 |
| 17 | −0.00184563 | 0.60000000 |
| 18 | −0.00216977 | 0.70000000 |
| 19 | −0.00248610 | 0.80000000 |
| 20 | −0.00279162 | 0.90000000 |
| 21 | −0.00309164 | 1.00000000 |
| | A cut in the slow axis plane, full field. | |
| 1 | −0.00295800 | −1.00000000 |
| 2 | −0.00300408 | −0.90000000 |
| 3 | −0.00304104 | −0.80000000 |
| 4 | −0.00306979 | −0.70000000 |
| 5 | −0.00309123 | −0.60000000 |
| 6 | −0.00310627 | 0.50000000 |
| 7 | −0.00311585 | −0.40000000 |
| 8 | −0.00312088 | −0.30000000 |
| 9 | −0.00312232 | −0.20000000 |
| 10 | −0.00312109 | −0.10000000 |
| 11 | −0.00311815 | −1.38777878E−16 |
| 12 | −0.00311444 | 0.10000000 |
| 13 | −0.00311090 | 0.20000000 |
| 14 | −0.00310848 | 0.30000000 |
| 15 | −0.00310813 | 0.40000000 |
| 16 | −0.00311079 | 0.50000000 |
| 17 | −0.00311740 | 0.60000000 |
| 18 | −0.00312889 | 0.70000000 |
| 19 | −0.00314620 | 0.80000000 |
| 20 | −0.00317024 | 0.90000000 |
| 21 | −0.00320194 | 1.00000000 |
| | A cut in the slow axis plane, on axis. | |
| 1 | 0.00027444 | −1.00000000 |
| 2 | 0.00023585 | −0.90000000 |
| 3 | 0.00020564 | −0.80000000 |
| 4 | 0.00018293 | −0.70000000 |
| 5 | 0.00016678 | −0.60000000 |
| 6 | 0.00015629 | −0.50000000 |
| 7 | 0.00015051 | −0.40000000 |
| 8 | 0.00014851 | −0.30000000 |
| 9 | 0.00014936 | −0.20000000 |
| 10 | 0.00015211 | −0.10000000 |
| 11 | 0.00015581 | −1.38777878E−16 |
| 12 | 0.00015952 | 0.10000000 |
| 13 | 0.00016229 | 0.20000000 |
| 14 | 0.00016318 | 0.30000000 |
| 15 | 0.00016124 | 0.40000000 |
| 16 | 0.00015553 | 0.50000000 |
| 17 | 0.00014511 | 0.60000000 |
| 18 | 0.00012906 | 0.70000000 |
| 19 | 0.00010646 | 0.80000000 |
| 20 | 0.00007637 | 0.90000000 |
| 21 | 0.00003791 | 1.00000000 |
| | A cut in the slow axis plane, minus full field. | |
| 1 | 0.00351334 | −1.00000000 |
| 2 | 0.00348162 | −0.90000000 |
| 3 | 0.00345756 | −0.80000000 |
| 4 | 0.00344026 | −0.70000000 |
| 5 | 0.00342878 | −0.60000000 |
| 6 | 0.00342220 | −0.50000000 |
| 7 | 0.00341959 | −0.40000000 |
| 8 | 0.00342000 | −0.30000000 |
| 9 | 0.00342249 | −0.20000000 |
| 10 | 0.00342613 | −0.10000000 |
| 11 | 0.00342995 | −1.38777878E−16 |
| 12 | 0.00343301 | 0.10000000 |
| 13 | 0.00343438 | 0.20000000 |
| 14 | 0.00343310 | 0.30000000 |
| 15 | 0.00342822 | 0.40000000 |
| 16 | 0.00341883 | 0.50000000 |
| 17 | 0.00340398 | 0.60000000 |
| 18 | 0.00338275 | 0.70000000 |
| 19 | 0.00335422 | 0.80000000 |
| 20 | 0.00331748 | 0.90000000 |
| 21 | 0.00327164 | 1.00000000 |

TABLE 2d

Divergence at the Modulator Plane from Laser Facet 3

| | Angle tangents | Relative Aperture |
|---|---|---|
| | A cut in the fast axis plane, full field. | |
| 1 | 0.00309133 | −1.00000000 |
| 2 | 0.00279134 | −0.90000000 |
| 3 | 0.00248585 | −0.80000000 |
| 4 | 0.00216956 | −0.70000000 |
| 5 | 0.00184545 | −0.60000000 |
| 6 | 0.00151721 | −0.50000000 |
| 7 | 0.00118583 | −0.40000000 |
| 8 | 0.00085078 | −0.30000000 |
| 9 | 0.00051294 | −0.20000000 |
| 10 | 0.00017507 | −0.10000000 |
| 11 | −0.00016076 | −1.38777878E−16 |
| 12 | −0.00049455 | 0.10000000 |
| 13 | −0.00082627 | 0.20000000 |
| 14 | −0.00115397 | 0.30000000 |
| 15 | −0.00147546 | 0.40000000 |
| 16 | −0.00179085 | 0.50000000 |
| 17 | −0.00210177 | 0.60000000 |
| 18 | −0.00240818 | 0.70000000 |
| 19 | −0.00270718 | 0.80000000 |
| 20 | −0.00299623 | 0.90000000 |
| 21 | −0.00328065 | 1.00000000 |
| | A cut in the fast axis plane, on axis. | |
| 1 | 0.00318603 | −1.00000000 |
| 2 | 0.00289384 | −0.90000000 |
| 3 | 0.00259657 | −0.80000000 |
| 4 | 0.00228893 | −0.70000000 |
| 5 | 0.00197367 | −0.60000000 |
| 6 | 0.00165409 | −0.50000000 |
| 7 | 0.00133069 | −0.40000000 |
| 8 | 0.00100241 | −0.30000000 |
| 9 | 0.00066963 | −0.20000000 |
| 10 | 0.00033482 | −0.10000000 |
| 11 | −3.65372880E−18 | −1.38777878E−16 |
| 12 | −0.00033482 | 0.10000000 |
| 13 | −0.00066963 | 0.20000000 |
| 14 | −0.00100241 | 0.30000000 |
| 15 | −0.00133069 | 0.40000000 |
| 16 | −0.00165409 | 0.50000000 |
| 17 | −0.00197367 | 0.60000000 |
| 18 | −0.00228893 | 0.70000000 |
| 19 | −0.00259657 | 0.80000000 |
| 20 | −0.00289384 | 0.90000000 |
| 21 | −0.00318603 | 1.00000000 |

TABLE 2d-continued

Divergence at the Modulator Plane from Laser Facet 3

| | Angle tangents | Relative Aperture |
|---|---|---|
| | A cut in the fast axis plane, minus full field. | |
| 1 | 0.00328065 | −1.00000000 |
| 2 | 0.90299623 | −0.90000000 |
| 3 | 0.00270718 | −0.80000000 |
| 4 | 0.00240818 | −0.70000000 |
| 5 | 0.00210177 | −0.60000000 |
| 6 | 0.00179085 | −0.50000000 |
| 7 | 0.00147546 | −0.40000000 |
| 8 | 0.00115397 | −0.30000000 |
| 9 | 0.00082627 | −0.20000000 |
| 10 | 0.00049455 | −0.10000000 |
| 11 | 0.00016076 | −1.38777878E−16 |
| 12 | −0.00017507 | 0.10000000 |
| 13 | −0.00051294 | 0.20000000 |
| 14 | −0.00085078 | 0.30000000 |
| 15 | −0.00118583 | 0.40000000 |
| 16 | −0.00151721 | 0.50000000 |
| 17 | −0.00184545 | 0.60000000 |
| 18 | −0.00216956 | 0.70000000 |
| 19 | −0.00248585 | 0.80000000 |
| 20 | −0.00279134 | 0.90000000 |
| 21 | −0.00309133 | 1.00000000 |
| | A cut in the slow axis plane, full field. | |
| 1 | −0.00303804 | −1.00000000 |
| 2 | −0.00308397 | −0.90000000 |
| 3 | −0.00312080 | −0.80000000 |
| 4 | −0.00314940 | −0.70000000 |
| 5 | −0.00317070 | −0.60000000 |
| 6 | −0.00318561 | −0.50000000 |
| 7 | −0.00319506 | −0.40000000 |
| 8 | −0.00319997 | −0.30000000 |
| 9 | −0.00320128 | −0.20000000 |
| 10 | −0.00319993 | −0.10000000 |
| 11 | −0.00319687 | −1.38777878E−16 |
| 12 | −0.00319304 | 0.10000000 |
| 13 | −0.00318939 | 0.20000000 |
| 14 | −0.00318686 | 0.30000000 |
| 15 | −0.00318641 | 0.40000000 |
| 16 | −0.00318897 | 0.50000000 |
| 17 | −0.00319549 | 0.60000000 |
| 18 | −0.00320689 | 0.70000000 |
| 19 | −0.90322411 | 0.80000000 |
| 20 | −0.00324808 | 0.90000000 |
| 21 | −0.00327969 | 1.00000000 |
| | A cut in the slow axis plane, on axis. | |
| 1 | 0.00019502 | −1.00000000 |
| 2 | 0.00015654 | −0.90000000 |
| 3 | 0.00012646 | −0.80000000 |
| 4 | 0.00010385 | −0.70000000 |
| 5 | 0.00008782 | −0.60000000 |
| 6 | 0.00007743 | −0.50000000 |
| 7 | 0.00007175 | −0.40000000 |
| 8 | 0.00006986 | −0.30000000 |
| 9 | 0.00007080 | −0.20000000 |
| 10 | 0.00007365 | −0.10000000 |
| 11 | 0.00007744 | −1.38777878E−16 |
| 12 | 0.00008123 | 0.10000000 |
| 13 | 0.00008409 | 0.20000000 |
| 14 | 0.00008505 | 0.30000000 |
| 15 | 0.00008318 | 0.40000000 |
| 16 | 0.00007754 | 0.50000000 |
| 17 | 0.00006719 | 0.60000000 |
| 18 | 0.00005121 | 0.70000000 |
| 19 | 0.00002866 | 0.80000000 |
| 20 | −0.00000137 | 0.90000000 |
| 21 | −0.00003978 | 1.00000000 |
| | A cut in the slow axis plane, minus full field. | |
| 1 | 0.00343446 | −1.00000000 |
| 2 | 0.00340283 | −0.90000000 |
| 3 | 0.00337886 | −0.80000000 |
| 4 | 0.00336164 | −0.70000000 |
| 5 | 0.00335024 | −0.60000000 |
| 6 | 0.00334374 | −0.50000000 |
| 7 | 0.00334120 | −0.40000000 |
| 8 | 0.00334169 | −0.30000000 |
| 9 | 0.00334425 | −0.20000000 |
| 10 | 0.00334795 | −0.10000000 |
| 11 | 0.00335183 | −1.38777878E−16 |
| 12 | 0.00335495 | 0.10000000 |
| 13 | 0.00335637 | 0.20000000 |
| 14 | 0.00335514 | 0.30000000 |
| 15 | 0.00335031 | 0.40000000 |
| 16 | 0.00334096 | 0.50000000 |
| 17 | 0.00332614 | 0.60000000 |
| 18 | 9.00330495 | 0.70000000 |
| 19 | 0.00327645 | 0.80000000 |
| 20 | 0.00323974 | 0.90000000 |
| 21 | 0.00319392 | 1.00000000 |

What I claim is the following:

1. A system comprising a laser diode based illuminator for a spatial light modulator having multiple line segments linearly disposed, comprising a laser diode bar with multiple beam emitters along a linear axis, a cylinder lens disposed in the path of the beams to partially converge the fast axis of the laser diode beams, and means including a multi segmented objective lens and a field lens in the path of the beams subsequent to the cylinder lens to converge the multiple beams of diode light into successive segments, each directed with separate beam rise onto the aperture of a different line segment of the spatial light modulator.

2. A system as in claim 1 where the multi-segmented objective lens comprises a series of objective asphere/prism segments.

3. A system as in claim 1, wherein prismatic power is incorporated into the separate objective segments, and rise in beam height takes place in the space between the objective and the image.

4. A system as in claim 3 where the prismatic power is located in the space between the objective and the image after the segmented objective.

5. A system as in claim 1, wherein rise in beam height takes place in the space between the laser diode bar and the objective.

6. A system as in claim 5 where the prismatic power is combined with the objective segments.

7. A system as in claim 1 where the field lens directs the central beams from successive laser beam emitters parallel to the optical axis.

8. A system as in claim 7 where the aperture of the modulator is longer than the total sum of center to center distances of the laser beam emitters and the means to converge includes prismatic power chosen to spread the beam paths to contiguously illuminate successive contiguous segments of the modulator aperture.

9. A system as in claim 1 where the laser beam emitters are imaged at the modulator in both the slow and the fast axis.

10. A system as in claim 1 where the fast axis of the laser facets is imaged at the modulator, and the slow axis of the laser diodes is collimated at the modulator into parallel beams.

11. A system providing a laser based illuminator for a spatial light modulator comprising: two laser diode bars, each with multiple emitters, each disposed along a different line, a different multi-faceted objective disposed to receive light from each laser diode bar, a different rod lens means disposed to partially converge beams along the fast axis of the laser diodes from each bar onto each multi-facetted objective, a half wave plate disposed in the path of the beams of one set of the two beam paths to rotate the plane of polarization, the beams of both sets being angled toward a common region, a polarization beam combiner disposed to combine the two beam sets into a common path, and a single field lens disposed on the common path to converge the light from both laser diode arrays onto the segments at the aperture of a spatial light modulator.

12. A system as in claim 11 above, wherein the laser diode beams have major polarization directions orthogonal to each other and the polarization beam combiner comprises a polarization rotator plate and an optical cube having polarization selective reflecting and transmitting properties.

13. A laser diode based illuminator apparatus using spatial light modulators, wherein the illuminator includes a series of laser diode facets on a bar, means for imaging the laser facets through a multi segmented objective and a field lens to separately illuminate the different segments of the total line aperture of the modulator, where the sum of the Lagrange products of the laser emitters is matched to the Lagrange admittance of the modulator.

14. An apparatus as in claim 13 where the focal length and focal point of the field lens is chosen in conjunction with the separation of the laser facets and the length of the modulator to be illuminated, to render the central rays of the successive beams parallel to the axis and to illuminate successive line segments of the modulator aperture with contiguous line segments from successive facets of the laser bar.

15. A method as in claim 13 where the aspheric power of each of the objective lens segments is chosen, in conjunction with the other optical power within the system, to image the laser facets at the modulator in the fast axis direction, and to collimate the beams in the slow axis direction.

* * * * *